Feb. 18, 1958  J. F. MURRAY  2,823,518
AIRCRAFT FUEL PUMPING SYSTEM
Filed Nov. 19, 1953  5 Sheets-Sheet 1

Inventor
John F. Murray

Feb. 18, 1958  J. F. MURRAY  2,823,518
AIRCRAFT FUEL PUMPING SYSTEM
Filed Nov. 19, 1953  5 Sheets-Sheet 4

Fig. 8

Inventor
John F. Murray
Hill Sherman Meroni Gross & Simpson
Attys

United States Patent Office 2,823,518
Patented Feb. 18, 1958

2,823,518

AIRCRAFT FUEL PUMPING SYSTEM

John F. Murray, Macedonia, Ohio, assignor to Thompson Products, Inc., Cleveland, Ohio, a corporation of Ohio Application November 19, 1953, Serial No. 393,036

13 Claims. (Cl. 60—35.6)

This invention relates generally to aircraft fuel pumping systems and more particularly relates to a fuel system for a propulsion means in an aircraft wherein all by-passed fuel is returned to a point of highest pressure ahead of fuel pump discharge and preferably a point interstage of a multiple fuel pump including a first centrifugal impeller stage and a subsequent positive displacement gear stage in series relationship therewith.

A major problem in the development of a fuel system for a jet propelled aircraft is the problem of fuel temperature rise. This problem is acute due to the large variance between fuel consumption at sea level operation and fuel consumption at high altitude operation of the jet propulsion engines.

In one form of jet aircraft engine fuel system, a constant displacement fuel pump is provided in conjunction with a flow control unit which can be regulated in accordance with engine requirements. With such an arrangement, the fuel flow in excess of engine requirement is by-passed by the control and is returned to some point in the fuel system ahead of the control. This by-passed flow becomes a sizable percentage of pump capacity at high altitudes where engine fuel consumption is low. Under such conditions, a large part of the input horsepower required to drive the fuel pump and to force pressurized fuel to the burner units of the jet engine is absorbed into the fuel system as heat. Consequently, the fuel within the fuel system is subjected to a temperature rise which may reach a point resulting in serious pumping problems.

For example, fuel vapors may be formed at the inlet sides of the series-staged pumping elements in the fuel pump. As the fuel temperature rises, the vapor pressure of the fuel also rises. Consequently, if such fuel is returned to a point of pressure lower than the vapor pressure, the vapor would be rejected by the fuel. Moreover, if such vapor formation is excessive, cavitation will be induced within the fuel pump.

The problem of fuel temperature rise is further compounded because of the tendency to induce the formation of vapor within the flow control unit because of the effect of throttling the fuel through the flow control unit.

Fuel temperature rise in a fuel system is further objectionable in that fuel may be required for the purpose of cooling oil used to lubricate gear boxes and bearings. It is important that the fuel used as a coolant in a heat exchanger be kept at a minimal temperature so that the heat transfer between the oil and the fuel will be as great as possible.

Several solutions for fuel temperature rise have been suggested heretofore. One suggested solution is the provision of a variable displacement fuel pump, the capacity of which is automatically adjusted to the engine fuel consumption. By such provision, by-pass means are eliminated. Such a system appears to be deficient in that at high altitudes when fuel consumption is low, the pump operates at a very small part of its full capacity and, accordingly, the pump enjoys only an extremely low overall efficiency. Thus, brake horsepower input, or total heat, is very high for a small return of pressurized flow. Furthermore, such a pump offers a very small advantage insofar as reduction in fuel temperature rise is concerned and requires a far greater complexity of pump structure than would be otherwise anticipated.

A second suggested solution was the provision of a pump driven by variable speed hydraulic transmission. Such a system is deficient in that the reduction effected in fuel temperature rise is offset by the heat rejected to the hydraulic fluid by the hydraulic transmission due to its inefficiency. In other words, added heat is supplied to the oil which will be subsequently rejected to the fuel upon passing through an oil heat exchanger.

In accordance with the principles of the present invention, the deficiencies of the prior suggested solutions have been successfully overcome by the utilization of means formed to provide a by-pass passage for returning all by-passed fuel to the point of highest pressure ahead of the fuel pump discharge, namely, a point interstage of a multiple stage fuel pump having a centrifugal inlet stage in series with a positive displacement gear pump stage. By virtue of such provision, the maximum altitude obtainable is greatly increased and an increase in the pressure rise across the centrifugal impeller is obtained so that the volume of flow displaced by the centrifugal stage is reduced and the discharge pressure increased in proportion to the quantity of fuel by-passed, thereby affording optimum operating conditions.

According to one form of the invention, the second stage of the pump comprises a plurality of meshing gear impellers. The flow of the various gear elements is automatically by-passed at low pressure at various predetermined altitudes, for example, through the utilization of an altitude-responsive selector valve. The number of gear elements and the altitudes at which their flow is by-passed may be so arranged that the flow from the unit will be matched closely to the engine consumption and so that the quantity of flow by-passed from the flow control unit to the interstage point between the centrifugal element and the gear stage may be minimized.

In another form of the invention, a separate multistage pump is provided for the main burner control and a separate after burner pump is provided for the after burner control. Each of the pumping units is associated with a flow control unit provided to control the flow of fuel to the main burners and the after-burners, respectively. The fuel system of this form of the invention includes means formed to provide separate and independent by-pass passages from each of the control units to a point interstage of the respective fuel pumps. Moreover, means are provided which form an interconnection between the independent by-pass lines, which interconnection includes a flow-limiting orifice permitting the supply of a sufficient flow of fluid to the after burner pump to prevent the unit from running completely dry even if the flow of fuel to the after-burner unit is cut off completely.

In a system wherein the after-burner pump displacement is high compared to the main burner pump displacement so that a considerable mass of fuel is available to absorb heat, the present invention contemplates the utilization of two separate pumps including a main burner pump and an after-burner pump, the after-burner pump having a centrifugal element and a gear pump element in series with one another and the main pump having at least one pair of intermeshing gear impellers also in series with the centrifugal impeller of the after-burner pump. By-pass means from both the main burner control and the after-burner control return by-passed fuel to an interstage point between the centrifugal pumping element and the gear impellers.

In cases where it is not feasible to interconnect the afterburner pump with the main burner pump, the present invention contemplates the utilization of separate main burner and after-burner pumps each including a centrifugal pumping element and a gear pumping element in series therewith. In the discharge line of the after-burner pump, there is placed a bleed line connected to a valve which will be in a closed position when after-burning fuel is required. By controlling the position of the valve by means of the discharge pressure or the after-burner pump, the valve may be opened to permit flow when discharge pressure has dropped to recirculating pressure. The discharge from the valve is returned to an interstage point and a restriction bleeder line is located between the bleed line of the after-burner pump and a point interstage of the centrifugal element and the gear element of the main pump. In this arrangement, the main pump is also provided with a by-pass return between the main flow control unit and a point interstage the centrifugal and gear elements of the main pump.

It is an object of the present invention, therefore, to provide a fuel system for a jet aircraft propulsion means which effectively solves the problem of fuel temperature rise.

Another object of the present invention is to provide a fuel system wherein all by-passed fuel is returned to the point of highest pressure ahead of the fuel pump discharge.

Yet another object of the present invention is to provide a fuel system for a jet aircraft wherein fuel temperature rise will be minimized.

Another object of the present invention is to provide a multiple fuel pump having centrifugal and gear pumping stages wherein the centrifugal stage is selectively by-passed.

Another object of the present invention is to provide a by-pass arrangement for the fuel system of a jet aircraft propulsion means utilizing both main and after-burner flow control units wherein by-passed fuel from both of the controls is returned to a point interstage between centrifugal and gear pumping elements of a multiple fuel pump.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

Figure 1:
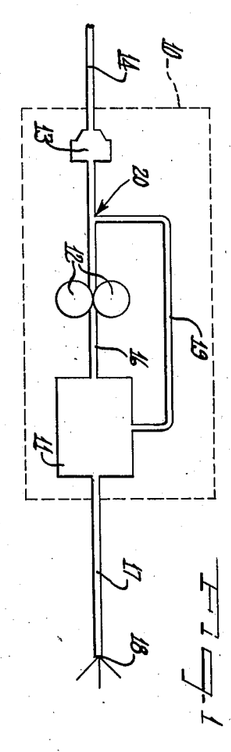
Figure 1 is a diagrammatic view of a fuel system provided in accordance with the principles of the present invention.

In Figure 1, a schematic or diagrammatic view of a fuel system is shown wherein the dotted line rectangle 10 encloses a system consisting of a pump and a fuel flow control unit indicated generally at 11. The pump comprises a positive constant displacement unit such as a gear or piston pump and in the preferred embodiment herein illustrated by way of example only it will be assumed that the pump comprises a pair of meshing gears forming a positive displacement gear pump 12 which is in series with a centrifugal pumping element 13 so that the inlet of the gear pump 12 will be provided with a high positive pressure.

A source of fuel supply, for example, the fuel cell of an aircraft (not shown) is connected to the inlet of the centrifugal pumping element 13 by means of a conduit 14 and it will be understood that the discharge side of the gear pump 12 is connected to the fluid flow control unit 11 by means of a conduit indicated at 16. From the flow control unit 11 the fuel passes through a conduit 17 to the burners 18 of a jet engine propulsion means utilized to drive the aircraft in flight.

Due to the large variance between fuel consumption at sea level operation and fuel consumption at high altitude operation of the burners 18, a condition is created at high altitude which requires that excess fuel above engine requirements be by-passed from the flow control unit 11 to some other point in the fuel system. The brake horsepower required to drive the pump including the centrifugal pumping element 13 and the gear pump elements 12 and to force pressurized fuel to the burners 18 under a by-pass operation will actually result in the transformation thereof into heat of the fuel or liquid being pumped. If it is assumed that the entire fuel system has reached temperature-equilibrium, there are two ways by which such heat will be released from the fuel system. One is by the dissipation to the ambient atmosphere and the other is by an increase of temperature of the fuel leaving the system over its temperature as it entered the system. The less fuel passing through the system, that is the smaller the engine fuel consumption at the burners 18, the greater the temperature rise for a given input horsepower. Furthermore, the less fuel passing through the system, the larger the quantity of fuel being returned to the pump inlet from the control by-pass.

In accordance with the principles of the present invention, objectionable fuel temperature rise is avoided by providing means formed to provide a by-pass passage 19 between the flow control unit 11 and a point 20 which is interstage the centrifugal pumping element 13 and the gear pumping elements 12, thereby to return all of the by-passed fuel to the point in the fuel system of highest pressure ahead of the fuel pump discharge.

By returning by-passed flow to the interstage point 20, the fuel system of the present invention will operate successfully at a much higher altitude than was possible heretofore. A further advantage of returning by-passed flow to the interstage point 20 resides in the pressure rise increase across the centrifugal pumping element 13. Such a pressure rise increase occurs because the flow pumped by the centrifugal pumping element 13 is substantially equal to the consumption of the burners 18 when the by-passed flow is returned to the discharge of the centrifugal pumping element 13 so that the actual volume flow displaced by the centrifugal pumping element 13 is reduced and the discharge pressure is increased in proportion to the quantity of fuel by-passed. This offers the optimum operation conditions insofar as obtaining the minimum absolute inlet pressure at which the pump might be operated.

Figure 2:
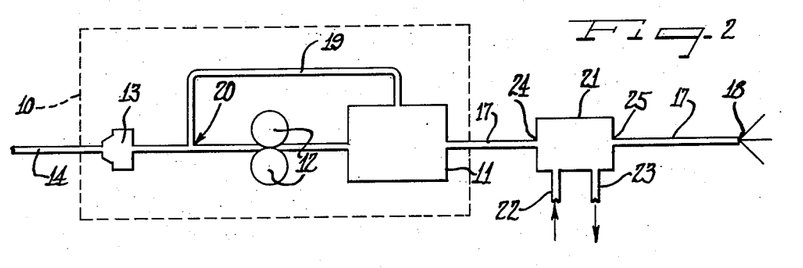
Figure 2 is a diagrammatic view of a fuel system similar to that shown in Figure 1 but incorporating an oil heat exchanger wherein the fuel of the fuel system is utilized as a coolant.

A further advantage of the interstage bleed-back provided in accordance with the principles of the present invention is illustrated advantageously by the structure shown in Figure 2. All of the components of the fuel system shown in Figure 2 are identical with those shown in Figure 1 and, like reference numerals have been applied wherever possible, however, additionally there is provided in Figure 2 an oil heat exchanger 21 having an oil inlet line 22 and an oil outlet line 23. Those versed in the art will recognize that the oil passing through the lines 22 and 23 is advantageously utilized in the mechanism of a jet aircraft for lubricating gear boxes and bearings. It is highly desirable, therefore, that the oil be cooled and to effect that end the oil is passed through the heat exchanger 21. As shown in Figure 2, the fuel of the fuel system is utilized as a coolant for the heat exchanger 21. Thus the heat exchanger 21 is located in the conduit 17, the heat exchanger 21 having a coolant inlet shown at 24 and a coolant outlet shown at 25. By locating the heat exchanger 21 downstream of the flow control unit 11, the minimization of fuel temperature rise through the by-pass return to the interstage point 20 insures that the fuel passing through the heat exchanger 21 enroute to the burners 18 will be kept as cool as possible, thereby maximizing the heat transfer between the oil passing through the lines 22 and 23 and the fuel passing between the coolant inlet 24 and the coolant outlet 25.

Figure 3:
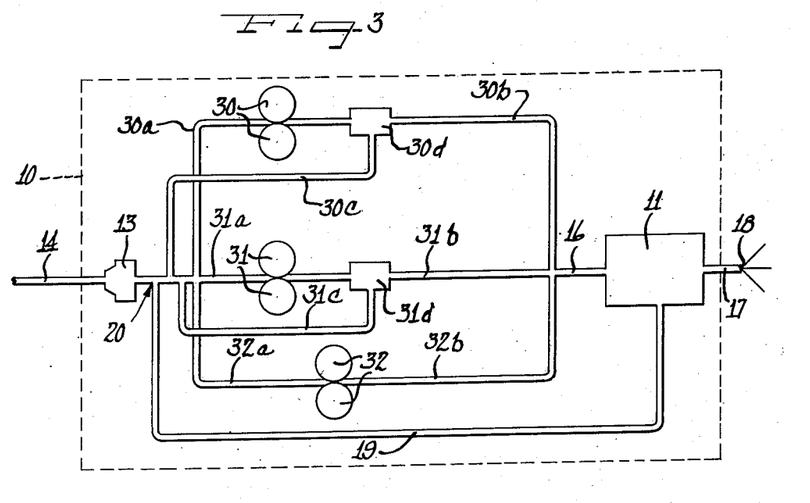
Figure 3 is a diagrammatic view of a fuel system provided in accordance with the principles of the present invention and generally similar to the fuel system of Figure 1 but showing a modified form of pumping means.

In the schematic arrangement illustrated by the diagrammatic view of Figure 3, the pump is modified to incorporate a plurality of gear pump stages in which the flow of the various gear pump elements is automatically by-passed at low pressure at various predetermined altitudes. All other components of the system illustrated in Figure 3 are similar to the components shown in connection with Figures 1 and 2 and, accordingly, like reference numerals have been applied wherever possible. Instead of the gear pumping elements 12, there is utilized in the arrangement of Figure 3 a plurality of gear pumping elements, for example, three separate units 30, 31, and 32. To complete the diagrammatic view, conduit connections are illustrated at 30a, 31a and 32a to form inlet means for the respective gear pumping elements 30, 31 and 32 and conduit connections are also shown at 30b, 31b and 32b which form discharge means for each of the respective gear pumping elements 30, 31 and 32, all of the discharge conduits having a common connection with the discharge conduit 16 leading to the flow control unit 11.

In addition to the by-pass passage 19 from the flow control unit 11 to the point interstage 20, there is additionally provided an independent by-pass passage 30c and an independent by-pass passage 31c each controlled, respectively, by an altitude-responsive valve 30d and 31d, respectively.

Since burner fuel consumption varies generally in accordance with the altitude of the aircraft, it will be understood that the altitude-responsive valves 30d and 31d are adjusted so that the by-pass flow through the independent by-pass passages 30c and 31c will be matched closely to the consumption at the burners 18 and so that the quantity of flow by-passed from the fuel control unit 11 through the by-pass passage 19 to the point interstage 20 will be minimized.

As a further refinement of the control system thus provided, the gear pumping elements 30 and 31 are of different displacement capacity determined in accordance with the determinable rate of change of fuel consumption, thereby embodying some of the advantages usually associated with a variable displacement pumping mechanism.

A further problem of fuel temperature rise is involved in the adaptation of an engine-driven pump to supply fuel for the propulsion means of a jet aircraft utilizing an after-burner as well as a main burner. In using a positive displacement pump in the after-burner fuel system, some disposition must be made of the operative capacity of such pump when the after-burner unit is out of operation.

In some aircraft utilizing after-burners in the jet propulsion means, air driven pumps have been utilized in the after-burner fuel system and the air supply is shut off whenever the after-burner is not required. Accordingly, the pump is cut out of the system by substituting an engine-driven pump, moreover, the entire system is considerably simplified since the control valve and other accessories necessary with air-driven equipment are eliminated.

By using an engine-driven pump, however, the after-burner pump must be protected during the period of operation when it is not supplying fuel to the after-burner nozzles. If a positive displacement pump is allowed to run dry, there is a serious danger that the components will overheat and will wear out quickly.

Figure 4:
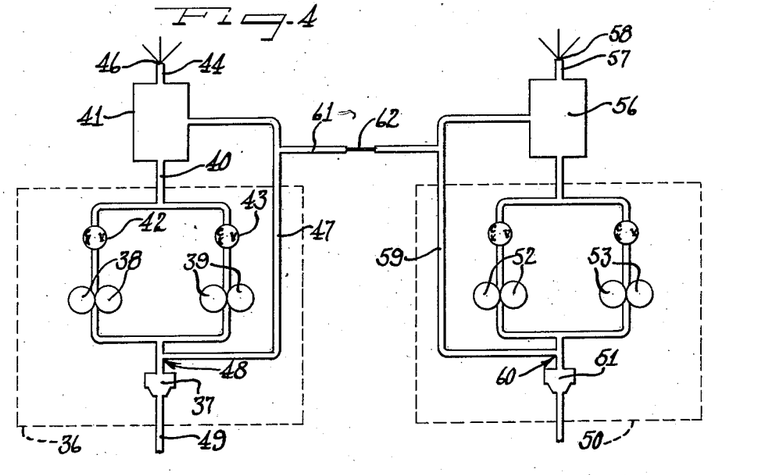
Figure 4 is a diagrammatic view of a fuel system provided in accordance with the principles of the present invention for the propulsion means of a jet aircraft utilizing main burners and after-burners.

The problem is successfully solved in accordance with the principles of the present invention as shown by the system illustrated diagrammatically in Figure 4.

In Figure 4, a main fuel pump is indicated at 36 in dotted lines and includes a centrifugal pumping element 37 in series with two pairs of gear pumping elements indicated at 38 and 39, respectively. The gear pumping elements 38 and 39 are shown connected in parallel with one another and discharge into a common outlet 40 connected to a main fuel flow control unit 41. Check valves 42 and 43 are provided on the discharge sides of the gear pumping elements 38 and 39 to prevent back-flow. The flow control unit 41 discharges through a conduit 44 to the main burner nozzles indicated at 46. Means forming a by-pass passage 47 return by-passed fluid from the flow control unit 41 to an interstage point indicated at 48 located between the centrifugal pumping impeller 37 and the gear pumping impellers 38 and 39. Fuel from a source of supply is conducted to the centrifugal pumping impeller 37 by means of a conduit 49.

The after-burner pump is indicated in dotted lines at 50 and comprises a centrifugal pumping element 51 in series with a pair of gear pumping elements 52 and 53, respectively, arranged in parallel with one another and discharging to a common outlet 54 connected to an after-burner flow control unit 56. Fuel from the flow-control unit 56 is conducted by a conduit 57 to the after-burner nozzles 58. By-pass fluid is returned from the flow control unit 56 through a by-pass passage 59 to an interstage point 60 between the centrifugal impeller unit 51 and the gear pumping elements 52 and 53.

In accordance with the principles of the present invention, the main control by-pass line 47 and the after-burner control by-pass line 59 are interconnected as at 61, the interconnecting conduit 61 being formed to provide a flow-limiting restriction or orifice 62. In operation, even though the flow to the after-burner nozzles 58 is cut off completely, a sufficient amount of fuel will be available to the positive displacement stage of the after-burner pump 50 to prevent the unit from running completely dry.

Figure 5:
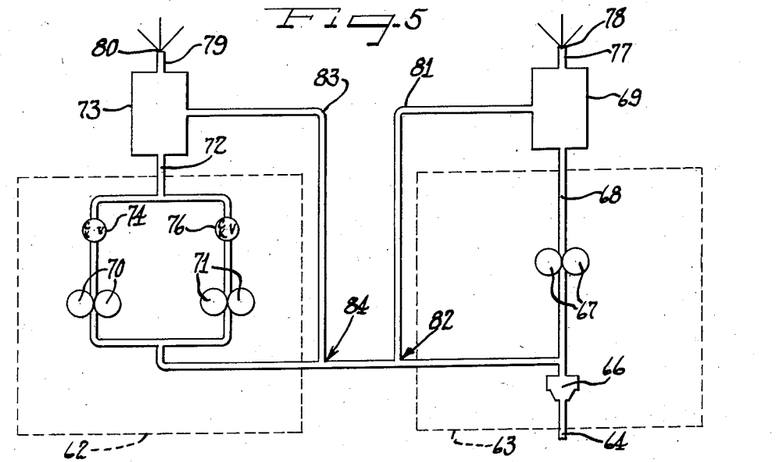
Figure 5 is a diagrammatic view of a fuel system generally similar to that shown in Figure 4 but modified for use in an installation wherein the displacement of the after-burner pump is high compared to the main pump.

In Figure 5 is shown a system wherein the displacement of the after-burner pump is high compared to the displacement of the main burner pump so that a considerable mass of fuel is available for heat absorption. In the embodiment of Figure 5, either separate engine-driven main burner and after-burner pumps may be utilized or a single pumping unit may be provided in the form of a unitary package-type pump with all of the various pumping elements connected to a common drive. As shown diagrammatically, however, there is provided the main burner pump 62 shown in dotted lines and the after-burner pump 63 also shown in dotted lines. The after-burner pump 63 includes a conduit 64 connected to a source of fuel supply and to a centrifugal pump impeller indicated at 66. The centrifugal pump impeller 66 is in series with a gear pumping stage 67 discharging through a conduit 68 to an after-burner flow control unit 69 and is also in series with a pair of positive displacement units comprising pairs of meshing gears 70 and 71 connected to a common discharge conduit 72 leading to a main burner flow control unit 73. The positive displacement units 70 and 71 are in parallel with one another and check valves indicated at 74 and 76, respectively, are provided to preclude back-flow in the event of inoperativeness of one of the units.

The after-burner flow control unit 69 delivers pressurized fuel through a conduit 77 to the after-burner nozzles 78 and the main burner flow control unit 73 delivers pressurized fuel through a conduit 79 to the main burner nozzles 80.

Means are provided which form a by-pass passage 81 between the after-burner flow control unit 69 and a point indicated at 82 which is interstage the centrifugal impeller 66 and the gear impellers 67, 70, 71. Means are also provided which form a by-pass passage 83 returning by-pass flow from the main burner flow control unit 73 to a point indicated at 84 which is also interstage the centrifugal impeller 66 and the gear impellers 67, 70, 71.

With the arrangement of Figure 5, the after-burner pumping system is tied in with the pumping system of the main burner control and, accordingly, the fuel temperature rise is minimized. For example, if it is assumed that the "mach" number is such that the ambient temperature is sufficiently high that no heat is dissipated from the fuel system, then after temperature equilibrium has been established within the pumping system all of the power required to drive the pumping units will tend to be transformed into thermal energy which will heat the engine flow from an initial temperature entering the pumping system to an elevated temperature upon leaving the pumping system. However, if there is a large quantity of fuel being recirculated in the system, there will be some heat transferred to the recirculated flow until temperature equilibrium is reached for the whole system. This becomes important since an aircraft may not fly long enough at conditions conducive to excessive fuel temperature rise for the pumping system to reach temperature equilibrium. With the arrangement shown in Figure 5, a considerable mass of fuel is available to absorb heat and consequently the interconnection of the after-burner system with the main burner system in conjunction with the flow by-pass of both of the flow control units to a point interstage the centrifugal and gear stages of the fuel pump minimize the fuel temperature rise in the entire fuel system.

Where it is not feasible to interconnect the after-burner pump with the main pump, provision must be made for preventing over-heating of the fuel when the total displacement of the after-burner is being recirculated. An arrangement for effecting such an objective is illustrated in Figure 6.

Figure 6:
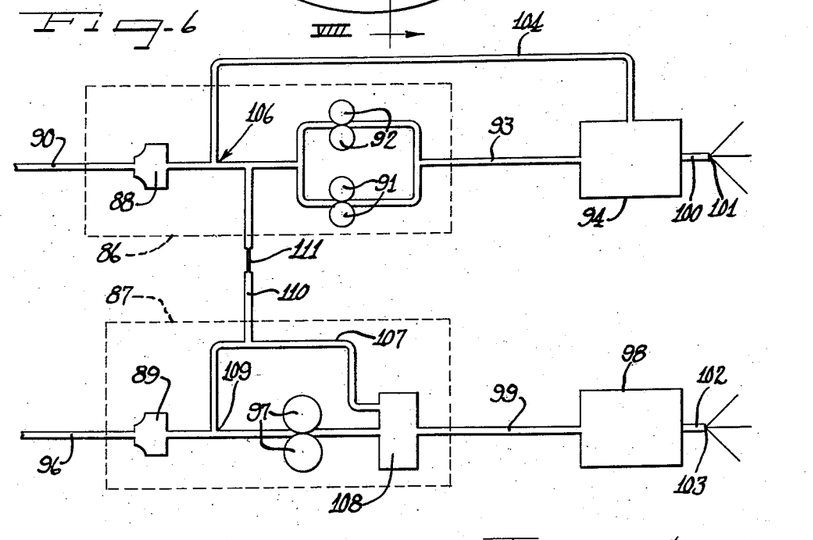
Figure 6 is a diagrammatic view of an alternative form of fuel system provided in accordance with the principles of the present invention.

In Figure 6, the main fuel pump is indicated in dotted lines at 86 and the after-burner fuel pump is indicated in dotted lines at 87. Each of the pumps includes a centrifugal pumping element indicated at 88 and 89, respectively, the centrifugal element 88 drawing fuel through a conduit 90 from a source of fuel supply and being in series with a pair of positive displacement pumping units 91 and 92. The positive displacement pumping units 91 and 92 preferably comprise pairs of meshing gears discharging through a common conduit 93 to a main burner flow control unit 94. The centrifugal pumping element 89 of the after-burner pump 87 draws fuel from a source of fuel supply through a conduit 96 and is in series with a positive displacement stage 97 preferably comprising a pair of meshing gears discharging to an after-burner flow control unit 98 through a conduit 99. The main burner flow control unit delivers pressured fuel through a conduit 100 to main burner nozzles 101, while the after-burner flow control unit delivers pressured fuel through a conduit 102 to after-burner nozzles 103.

Means are formed to provide a by-pass passage 104 from the main burner flow control unit 94 to a point indicated at 106 interstage the centrifugal pumping element 88 and the gear pumping elements 91 and 92. In the discharge line 99 of the after-burner pump 87 there is provided a means forming a bleed line 107. The bleed line 107 is connected to a valve 108 which will be in a closed position when after-burning fuel is required. By controlling the position of the valve 108 in response to variations in the discharge pressure of the after-burner pump 87, the valve 108 is opened to permit flow when the discharge pressure of the after-burner pump 87 has dropped to recirculating pressure. Those versed in the art will recognize that the valve 108 is preferably constructed to provide a metering flow of sufficient volume to prevent a serious rise in fuel temperature within the system. The discharge from the valve 108 is then returned either to the fuel tank, the inlet to the main fuel pump or to some other point in the system. In accordance with the principles of the present invention, the return is made to an interstage point indicated at 109 between the centrifugal pumping element 89 and the gear pumping elements 97.

Means are also provided to form an interconnection passage 110 between the main burner pump 86 and the after-burner pump 87, the connections of the passage 110 being made preferably at points interstage the centrifugal and gear impellers, for example, proximate the interstage points 106 and 109. The passage 110 is also formed with a flow-restricting orifice 111.

The structural characteristics of a preferred form of multiple pump provided in accordance with the principles of the present invention and described in connection with the diagrammatic views of Figures 1–6 are advantageously illustrated in Figures 7, 8 and 9.

Figure 7:
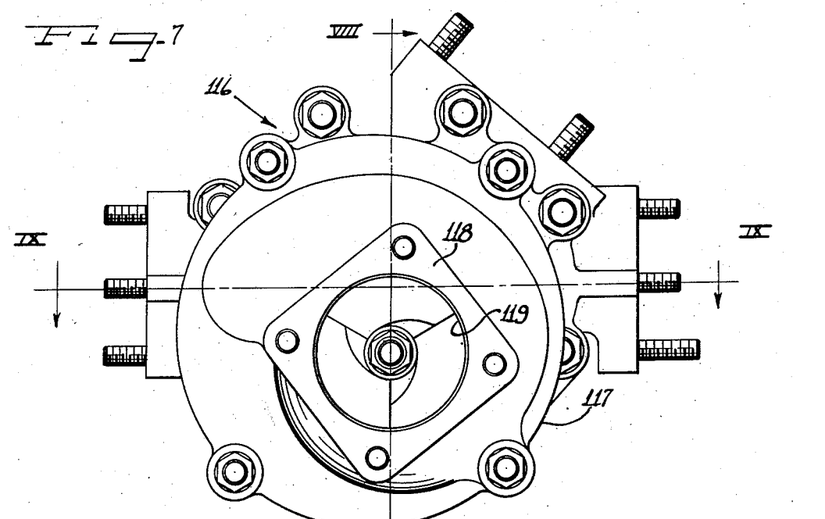
Figure 7 is an end elevational view of a multiple fuel pump provided in accordance with the principles of the present invention.
Figure 8:
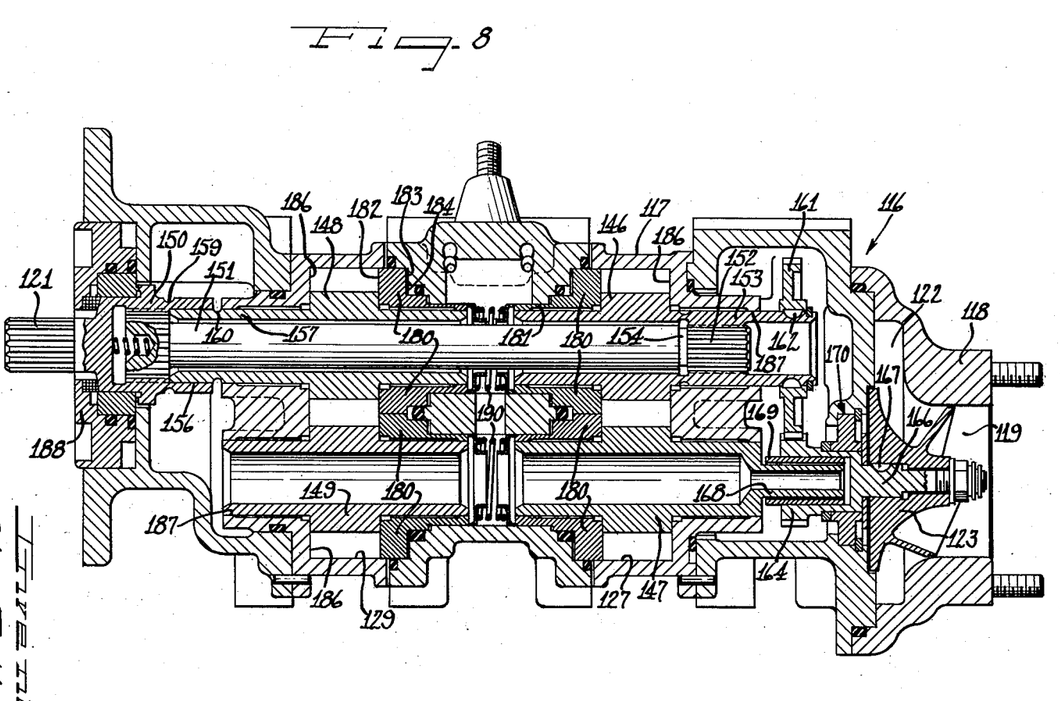
Figure 8 is a cross-sectional view taken substantially on line VIII—VIII of Figure 7.
Figure 9:
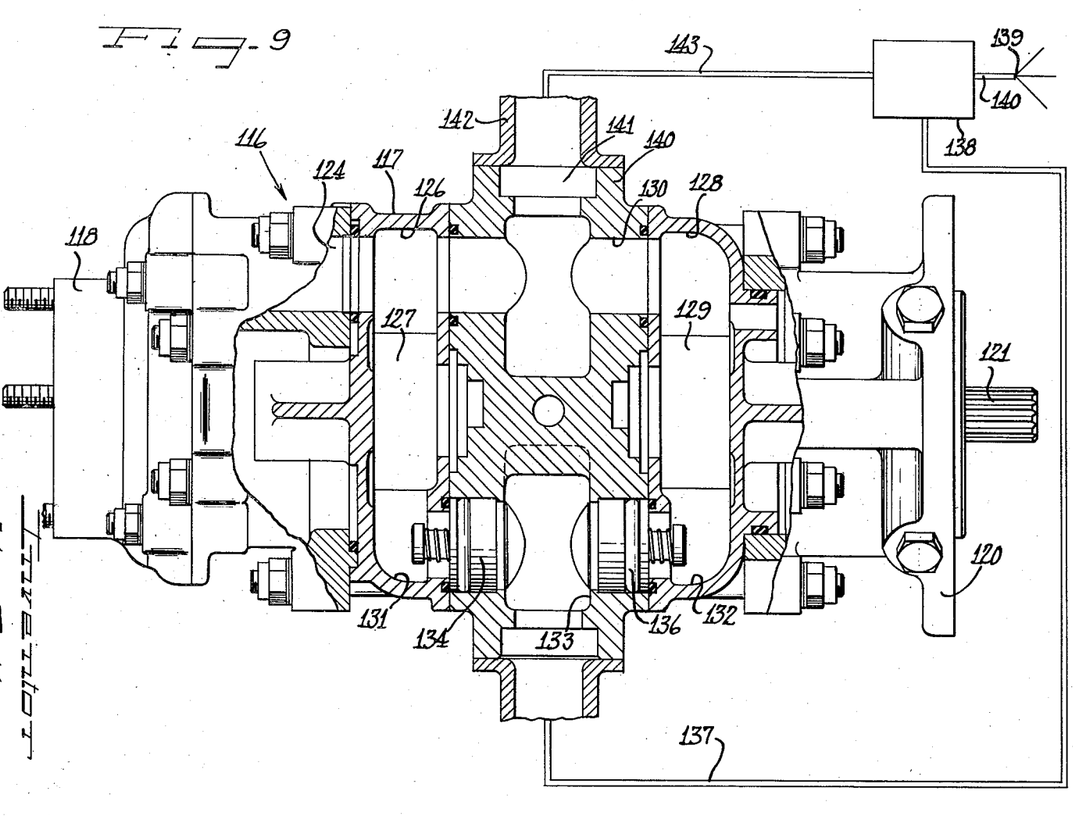
Figure 9 is a cross-sectional view with parts removed for the sake of clarity taken substantially on line IX—IX of Figure 7 and showing in diagrammatic form the utilization of the pump in a fuel system in accordance with the principles of the present invention.

As shown in Figures 7, 8 and 9, the pump indicated generally at 116 comprises a sectionalized casing 117 having a mounting pad 118 at one end thereof in which is formed a pump inlet 119.

At the opposite end of the casing 117 is provided a plate 120 providing a flat abutment surface and which is intersected by the splined end of a coupling shaft 121 adapted to be connected to the engine drive of a jet aircraft.

The pump 116 comprises a centrifugal pumping stage in series with a positive displacement pumping stage, the positive displacement pumping stage conveniently comprising two pairs of intermeshing gear impellers arranged in parallel with one another and having a common inlet supplied by the discharge of the centrifugal pumping element at a common outlet. Referring more specifically to the structural elements shown on the drawings, the casing 117 is provided with a volute pumping chamber 122 in which is rotated a centrifugal impeller 123. The fluid initially pressured by the centrifugal pumping element 123 leaves the volute pumping chamber 122 via a passage indicated at 124 on Figure 9 and communicates with a first inlet portion 126 for a gear pumping chamber 127 and a second inlet portion 128 for a gear pumping chamber 129, the respective inlet portions 126 and 128 being interconnected by a passage shown at 130.

The pumping chamber 127 is provided with an outlet portion 131 and the pumping chamber 129 is provided with an outlet portion 132. The outlet portions 131 and 132 are interconnected by passage means including a common outlet portion 133, the passage between each respective outlet portion 131 and 132 and the common outlet portion 133 being controlled by a first check valve 134 and a second check valve 136.

As shown diagrammatically in Figure 9 and as has been explained in great detail in connection with the fuel systems of Figures 1–6, outlet fluid from the pump 116 leaves the common outlet passage 133 through a conduit 137 and is delivered to a flow control unit indicated at 138 whereupon the fuel is supplied to burner nozzles 139 through conduit means 140.

On the casing 117 adjacent the interconnecting passage 130 is provided a boss 140 apertured as at 141. A nipple 142 is connected to the boss 140 for connecting the aperture 141 and the interconnecting inlet passage 130 to a by-pass passage providing conduit 143 returning the by-pass flow from the flow control unit 138 to an interstage point between the volute pumping chamber 122 and the gear pumping chambers 127 and 129. With this provision, all the by-passed fuel will be returned to the point of highest pressure ahead of the fuel pump discharge, namely, the interstage point between the centrifugal and gear pumping elements.

As shown in Figure 8, a pair of intermeshing gears including a driver gear 146 and a driven gear 147 are located in the pumping chamber 127 and a driver gear 148 and a driven gear 149 are located in the pumping chamber 129.

On the inside of the casing 117, the splined shaft 121 is provided with a rotatable drive coupling member 150 which takes the form of a collar of generally annular configuration.

The collar or drive coupling member 150 is internally splined to effect a coupling with a rotatable shaft member 151 independently rotatable within the hollow shaft portions of the driver gears 146 and 148, the opposite end of the shaft 151 having a splined connection as at 152 with a shaft extension 153 formed on the driver gear 146. A reduced shear neck 154 is provided in the shaft 151 to permit uninterrupted operation of the gears 148 and 149 in the event of binding or seizure of the gears 146 and 147.

The collar or drive coupling member 150 is further provided with an internal splined coupling as at 156 to the shaft extension 157 formed on one end of the driver gear 148. A first reduced shear neck 159 is provided on the collar 150 and a second reduced shear neck 160 is provided in the shaft extension 157 both of which shear sections permitting uninterrupted operation of the gears 146 and 147 in the event of binding or seizure of the gears 148 and 149.

On the end of the shaft extension 153 is provided a coupling gear member 161 keyed as at 162 for co-rotation with the shaft extension 153 and meshing with a gear 164 formed on the end of a stub shaft 166 carrying the centrifugal impeller member 123 and being keyed therewith as at 167.

The driven gear 147 is provided with a shaft extension 168 and a bearing sleeve 169 is inserted between the shaft extension 168 and the gear portion 164 of the stub shaft 166. Additional journaling support is provided for the stub shaft 166 by journaling and sealing means indicated generally at 170 and interposed between the casing 117 and the stub shaft 166.

The gear train coupling connection between the coupling gears 161 and 164 is preferably selected to drive the centrifugal impeller member 123 at much higher speeds than the rotational speed of the meshing gears 146, 147, 148, 149. For example, the rated speed of a centrifugal impeller similar to that shown at 123 is likely to be approximately 20,000 R. P. M. whereas the rated speed of the gear impellers is likely to be between 4,000 to 8,000 R. P. M. With the arrangement shown, the centrifugal impeller member 123 is journaled on the shaft extension of the driven gear 147 thereby affording great compactness and the inner and outer journaling members between the shaft extension 168 and the stub shaft 166 are permitted to rotate at different speeds. Accordingly, the entire multiple pump may be operated at much higher speeds than are usually available since the increased output of the centrifugal pumping element 123 is roughly proportional to the increased inlet losses which usually occur when positive displacement gear impellers are operated at higher speeds.

To assist in journaling the gears in the casing 117 and to provide a seal for retaining the fluid in the tooth spaces of the gears, movable pressure-loaded bushings are provided which are indicated at 180. Each of the bushings 180 includes a generally tubular extension 181 providing a bearing surface for journaling a corresponding shaft extension in the casing 117 and a radially outwardly extending flange portion providing a front sealing face 182 for engaging and sealing an adjoining gear side face and a rear pressure face 183 spaced from an adjoining casing wall to provide a pressure control chamber 184. Passage means are provided to communicate the pressure chamber 184 with fluid at pressure generated by the pump, for example, a passage can be extended through the flange of the bushings 180 communicating the discharge side of each respective gear pumping stage to the pressure chamber 184. Accordingly, the bushings 180 are pressure-loaded into sealing engagement with the gears.

On the opposite side of each respective gear member, stationary sealing faces and bearing surfaces are provided which in the preferred embodiment shown comprise portions of the casing 117 formed of a suitable bearing metal and shaped to provide a radially extending face 186 for engaging an adjoining side face of a gear and a generally tubular bearing surface 187 for journaling a corresponding shaft extension on one of the gears.

At the end of the casing 117 is provided a cover member 188 which encloses the usual sealing and bearing means required to seal and journal the shaft 121.

Initial loading of the movable bushings 180 against the gears 146, 147, 148, 149 is effected by the utilization of loading springs 190 interposed between opposed pairs of bushings 180 and thrusting the respective bushings against the adjoining gear side faces.

Although various minor structural modifications might be suggested by those versed in the art, it should be understood that I wish to embody within the scope of the patent warranted hereon all such modifications as reasonably and properly come within the scope of my contribution to the art.

I claim as my invention:

1. An aircraft fuel pumping system comprising, a two-stage fuel pump having an initial centrifugal stage in series with a positive displacement stage, fluid connections for said pump to carry fuel discharged from said pump, propulsion means for the aircraft including a main burner and an after-burner, a main burner control and an after-burner control in said fuel connections for regulating the flow of fuel through said fluid connections to said main burner and to said after-burner, and by-pass conduit means from both of the main and after burner controls to a point interstage between said centrifugal stage and said positive displacement stage for minimizing fuel temperature rise in said fuel pumping system by reducing the horsepower operating thereon.

2. In an aircraft, propulsion means including a main burner and an afterburner, and a fuel system for supplying fuel to said propulsion means comprising series-staged pumping means including a pump having a casing providing an inlet and an outlet and a series interconnected volute pumping chamber and intersecting gear pumping chamber therebetween, a centrifugal impeller in said volute pumping chamber to supply pressurized fluid to said gear pumping chamber, a pair of meshing rotary gears in said intersecting bore gear pumping chamber, a common drive means for said impeller and for said gears, means forming a by-pass inlet in said casing at a point interstage said volute pumping chamber and said intersecting bore gear pumping chamber, and conduit means formed to provide by-pass passages from said main burner and said afterburner to said by-pass inlet at a point interstage of said pumping means, thereby to minimize fuel temperature rise.

3. In an aircraft, propulsion means including a burner unit, a fuel system including a flow control unit connected to said burner unit and a series-staged pumping means supplying liquid fuel under pressure to said flow control unit including a pump having a casing providing an inlet and an outlet and a series interconnected volute pumping chamber and intersecting gear pumping chamber therebetween, a centrifugal impeller in said volute pumping chamber to supply pressurized fluid to said gear pumping chamber, a pair of meshing rotary gears in said intersecting bore gear pumping chamber, a common drive means for said impeller and for said gears, means forming a by-pass inlet in said casing at a point interstage said volute pumping chamber and said intersecting bore gear pumping chamber, and conduit means formed to provide a by-pass passage from said flow control unit to said by-pass inlet at a point interstage of said pumping means, thereby to return by-pass flow from said flow control unit with minimum temperature rise in said fuel system.

4. In an aircraft, propulsion means including a burner unit, a fuel system for said propulsion means including a flow control unit connected to said burner unit, and pumping means including first and second series stages, said second series stage comprising means forming a plurality of pumping means connected in parallel with one another and having a common discharge connection with said flow control unit, means formed to provide a local by-pass passage between at least one of said plurality of pump means to a point interstage said pump means and having an altitude-responsive valve in control of said local by-pass passage, and means formed to provide a by-pass passage between said flow control unit and a point interstage said pump means to return by-pass flow with minimum fuel temperature rise.

5. In an aircraft, propulsion means including a burner unit, a fuel system including a flow control unit to said burner unit and a pumping means including a centrifugal stage and a positive displacement gear stage in series therewith discharging to said flow control unit, and means formed to provide a by-pass passage between said flow control unit and a point interstage said centrifugal and gear stages to return by-pass flow with a minimum fuel temperature rise, said gear stage including a plurality of pairs of gears in parallel with one another, and altitude-responsive control means formed to provide a local by-pass passage between the discharge and inlet sides of at least one pair of said pairs of gears.

6. In an aircraft, propulsion means including a main burner unit and an after-burner unit, a fuel system including a main flow control and an after-burner flow control for said burner units, and a pumping means including a centrifugal stage and a positive displacement gear stage in series therewith to supply fuel to said flow control units, and conduit means forming a by-pass between each of said flow control units and a point interstage of said centrifugal and gear stages, thereby to return by-pass flow with minimum fuel temperature rise, said pumping means including a main pump and an after-burner pump, each of said pumps including a centrifugal impeller and a pair of meshing gears in series therewith, said conduit means including two independent by-pass passages between the fuel control units and the respective points interstage said centrifugal impellers and said gears of said pumps and further including means formed to provide a by-pass interconnection between said by-pass passages and being formed with a flow-limiting restriction therein, thereby to make fuel flow available to said after-burner pump even when flow to said after-burner unit is cut off completely.

7. In an aircraft, propulsion means including a main burner unit and an after-burner unit, a fuel system including a main flow control and an after-burner flow control for said burner units, and a pumping means including a centrifugal stage and a positive displacement gear stage in series therewith to supply fuel to said flow control units, and conduit means forming a by-pass between each of said flow control units and a point interstage of said centrifugal and gear stages, thereby to return by-pass flow with minimum fuel temperature rise, said pumping means including a main pump and an after-burner pump, one of said pumps having a centrifugal impeller, each of said pumps having a pair of meshing gears in series with said centrifugal impeller.

8. In an aircraft, propulsion means including a main burner unit and an after-burner unit, a fuel system including a main flow control and an after-burner flow control for said burner units, and a pumping means including a centrifugal stage and a positive displacement gear stage in series therewith to supply fuel to said flow control units, and conduit means forming a by-pass between each of said flow control units and a point interstage of said centrifugal and gear stages, thereby to return by-pass flow with minimum fuel temperature rise, said pumping means including a main pump and an after-burner pump, each of said pumps having a centrifugal impeller and a pair of meshing gears in series therewith, said after-burner pump having means formed to provide a bleed line in the discharge line thereof, a valve in said bleed line responsive to changes in the discharge pressure of the pump, and conduit means interconnecting said bleed line and a point interstage said centrifugal impeller and said pair of meshing gears in each pump and having formed therein a flow-limiting restriction to effect recirculation of fuel in said system with a minimum temperature rise.

9. A multiple pump unit comprising, a casing providing an inlet and an outlet and a series interconnected volute pumping chamber and intersecting bore gear pumping chamber therebetween, a centrifugal impeller rotatable in said volute pumping chamber to supply pressurized fluid to said gear pumping chamber, a pair of meshing rotary gears in said intersecting bore gear pumping chamber, a common driving means for said impeller and for said gears including speed-proportioning coupling means between said gears and said impeller to rotatably drive said impeller at speeds proportionally in excess of the rotational speeds of said gears and means forming a by-pass passage in said casing at a point interstage said volute pumping chamber and said intersecting bore gear pumping chamber.

10. A pump comprising a casing having an inlet and an outlet and providing a pair of intersecting bores forming a gear pumping chamber, rotary intermeshing gears in said chamber having inlet losses increasing in proportion to a function of rotational speed, said pump having a volute pumping chamber formed therein and arranged in series between said inlet and said gear pumping chamber, a centrifugal impeller journaled in said casing for rotation in said volute pumping chamber and having outlet pressure increasing in proportion to a function of rotational speed, said centrifugal impeller and said gear impellers being rated for greatest efficiency at different rotational speeds, gear reduction means between said impellers co-rotatably relating said impellers for rotation at proportionally different speeds, and means formed in said casing providing a by-pass inlet at a point interstage between said gear pumping chamber and said volute pumping chamber.

11. A fuel system for a jet aircraft propulsion means of the type having a main burner and an after-burner comprising a main burner flow control unit, an after-burner flow control unit and pumping means for supplying fuel under pressure to said flow control units, said pumping means including a multiple pump unit comprising a casing providing an inlet and an outlet, and a series interconnected volute pumping chamber and intersecting bore gear pumping chamber therebetween, a centrifugal impeller rotatable in said volute pumping chamber to supply pressurized fluid to said gear pumping chamber, a pair of meshing rotary gears in said intersecting bore gear pumping chamber, a common driving means for said impeller and said gears including speed-proportioning coupling means between said gears and said impeller to rotatably drive said impeller at speeds proportionally in excess of the rotational speeds of said gears, and means formed to provide a by-pass passage between both of said flow control units and a point interstage said volute pumping chamber and said gear pumping chamber, said casing having a by-pass opening formed therein at said interstage point.

12. An aircraft fuel system comprising fuel pumping means, a flow control unit receiving fluid discharged by said pumping means, burner nozzles supplied with fuel by said flow control unit, said pumping means including a pump having a casing with an inlet and an outlet and providing a pair of intersecting bores forming a gear pumping chamber, rotary intermeshing gears in said chamber having inlet losses increasing in proportion to a function of rotational speed, said pump having a volute pumping chamber formed therein and arranged in series between said inlet and said gear pumping chamber, a centrifugal impeller journaled in said casing for rotation in said volute pumping chamber and having output pressure increasing in proportion to a function of rotational speed, said centrifugal impeller and said gear impellers being rated for greatest efficiency at different rotational speeds, speed-proportioning means between said impellers co-rotatably coupling said impellers for rotation at proportionally different speeds, and means formed to provide a by-pass passage returning by-pass flow from said flow control unit to said pump casing, said pump casing having a by-pass opening at one point interstage said volute pumping chamber and said gear pumping chamber to return said by-pass flow at the point of highest pressure ahead of the pump discharge.

13. In an aircraft, propulsion means including a burner unit, and a fuel system for supplying fuel to said propulsion means, comprising, series-stage pumping means including a pump having a casing providing an inlet and an outlet and a series interconnected volute pumping chamber and gear pumping chamber therebetween, a centrifugal impeller in said volute pumping chamber to supply pressurized fluid to said gear pumping chamber, rotary meshing gears in said gear pumping chamber, a common drive means for said impeller and for said gears, means forming a by-pass inlet in said casing at a point interstage said volute pumping chamber and said gear pumping chamber, and conduit means formed to provide by-pass passages from said burner unit to said by-pass inlet, thereby to minimize fuel temperature rise.

References Cited in the file of this patent

UNITED STATES PATENTS

| | | |
|---|---|---|
| 1,927,799 | Mann | Sept. 19, 1933 |
| 2,330,558 | Curtis | Sept. 28, 1943 |
| 2,414,158 | Mock | Jan. 14, 1947 |
| 2,500,227 | Adams | Mar. 14, 1950 |
| 2,520,967 | Schmitt | Sept. 5, 1950 |
| 2,599,680 | Weeks | June 10, 1952 |
| 2,617,361 | Neal | Nov. 11, 1952 |
| 2,640,423 | Boyer | June 2, 1953 |
| 2,658,330 | Carey | Nov. 10, 1953 |
| 2,688,925 | Thoren et al. | Sept. 14, 1954 |
| 2,713,244 | Chandler | July 19, 1955 |
| 2,726,604 | Aspelin et al. | Dec. 13, 1955 |

FOREIGN PATENTS

| | | |
|---|---|---|
| 460,458 | Great Britain | Jan. 28, 1937 |